United States Patent [19]

Sato

[11] Patent Number: 4,489,395
[45] Date of Patent: Dec. 18, 1984

[54] INFORMATION PROCESSOR

[75] Inventor: Fumitaka Sato, Tokyo, Japan

[73] Assignee: Tokyo Shibaura Denki Kabushiki Kaisha, Japan

[21] Appl. No.: 375,702

[22] Filed: May 6, 1982

Related U.S. Application Data

[63] Continuation of Ser. No. 73,386, Sep. 7, 1979, abandoned.

[30] Foreign Application Priority Data

Sep. 11, 1978 [JP] Japan .................... 53-110703
Oct. 31, 1978 [JP] Japan .................... 53-133229

[51] Int. Cl.³ ............................. G06F 13/00
[52] U.S. Cl. .................................. 364/900
[58] Field of Search ................. 364/200, 900

[56] References Cited

U.S. PATENT DOCUMENTS

| | | | |
|---|---|---|---|
| 3,551,895 | 1/1968 | Driscoll, Jr. ........................ | 364/200 |
| 3,614,741 | 10/1971 | McFarland, Jr. .................... | 364/200 |
| 3,673,575 | 6/1972 | Burton et al. ....................... | 364/200 |
| 3,710,324 | 1/1973 | Cohen ................................. | 364/200 |
| 3,978,456 | 8/1976 | Moran ................................. | 364/200 |
| 3,991,404 | 11/1976 | Brioschi et al. .................... | 364/200 |
| 4,003,033 | 1/1977 | O'Keefe et al. ..................... | 364/200 |
| 4,050,058 | 9/1977 | Garlic ................................. | 364/200 |
| 4,067,059 | 1/1978 | Derchak ............................. | 364/200 |
| 4,099,231 | 7/1978 | Kotok et al. ........................ | 364/200 |
| 4,213,177 | 7/1980 | Schmidt .............................. | 364/200 |
| 4,237,543 | 12/1980 | Nishio et al. ....................... | 364/900 |
| 4,266,270 | 5/1981 | Daniels et al. ..................... | 364/200 |
| 4,271,466 | 6/1981 | Yamamoto et al. ................ | 364/200 |
| 4,296,469 | 10/1981 | Gunter et al. ...................... | 364/200 |

Primary Examiner—Raulfe B. Zache
Assistant Examiner—David Y. Eng
Attorney, Agent, or Firm—Kenyon & Kenyon

[57] ABSTRACT

Disclosed is an information processor provided with a main memory device capable of simultaneously reading or writing 2N bit data. 2N bit data read out from the main memory device is applied to a selector through a memory bus of 2N-bit construction. The selector devides the data comprising 2N bits in two N-bit units and then outputs that data into a scratch pad memory device constituted by N bits X M addresses. The data written in the scratch pad memory device in N bit units is processed by a central processing unit of N-bit architecture. For accessing the operand, the information processor accesses the main memory in N-bit units.

10 Claims, 19 Drawing Figures

F I G. 1
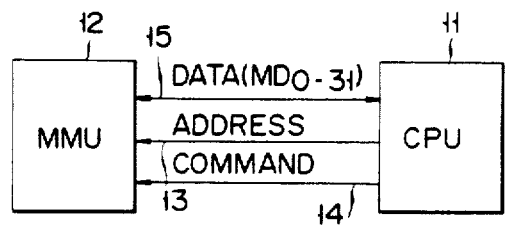
F I G. 2
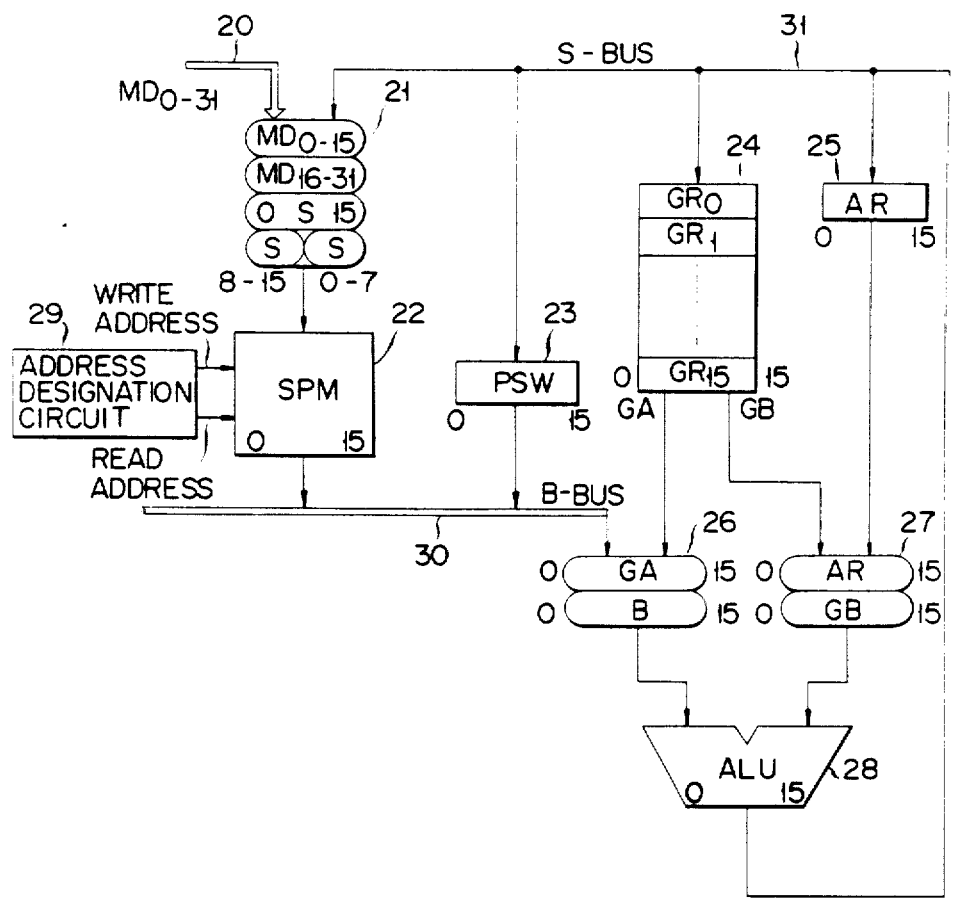

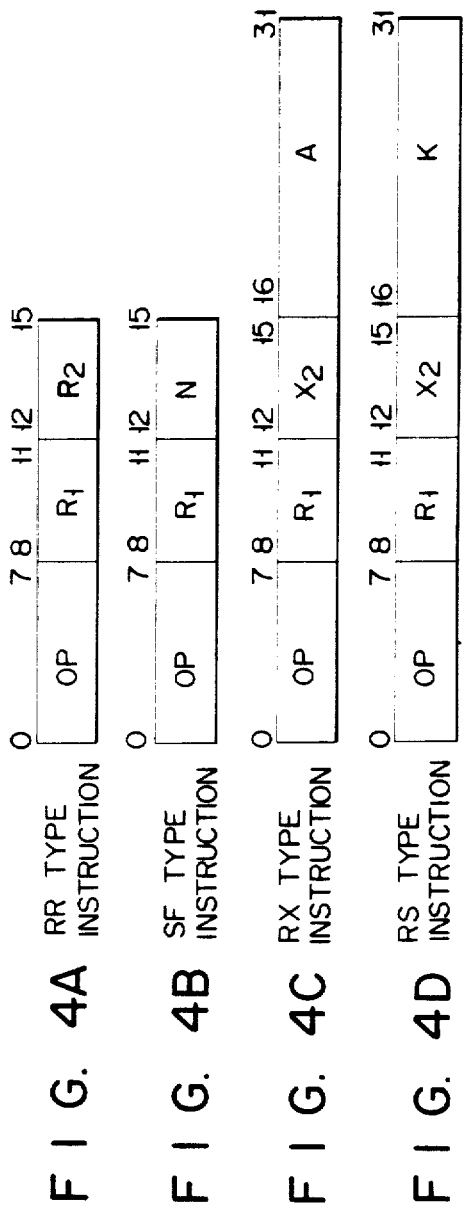
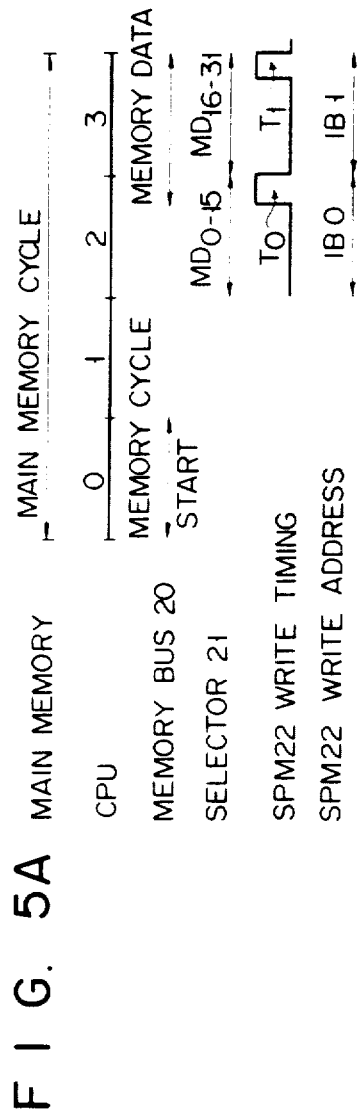
FIG. 4A RR TYPE INSTRUCTION
FIG. 4B SF TYPE INSTRUCTION
FIG. 4C RX TYPE INSTRUCTION
FIG. 4D RS TYPE INSTRUCTION
FIG. 5A

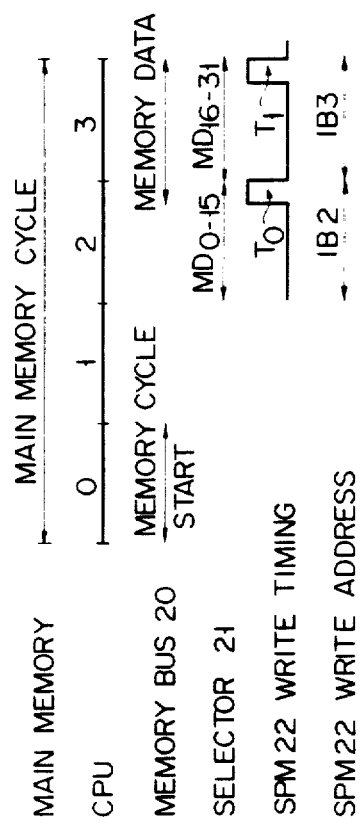
F I G. 5B
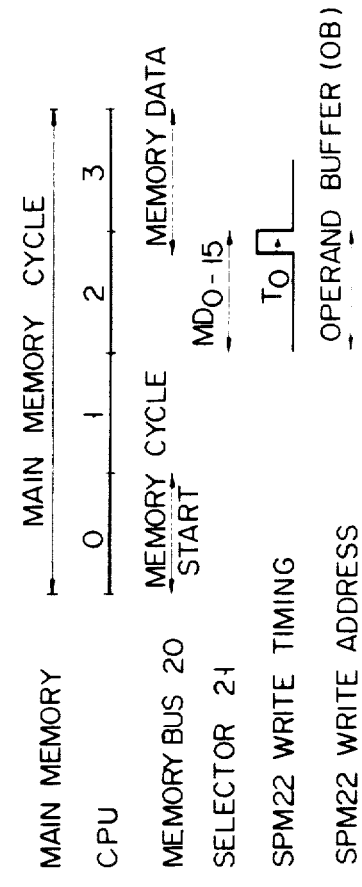
F I G. 5C

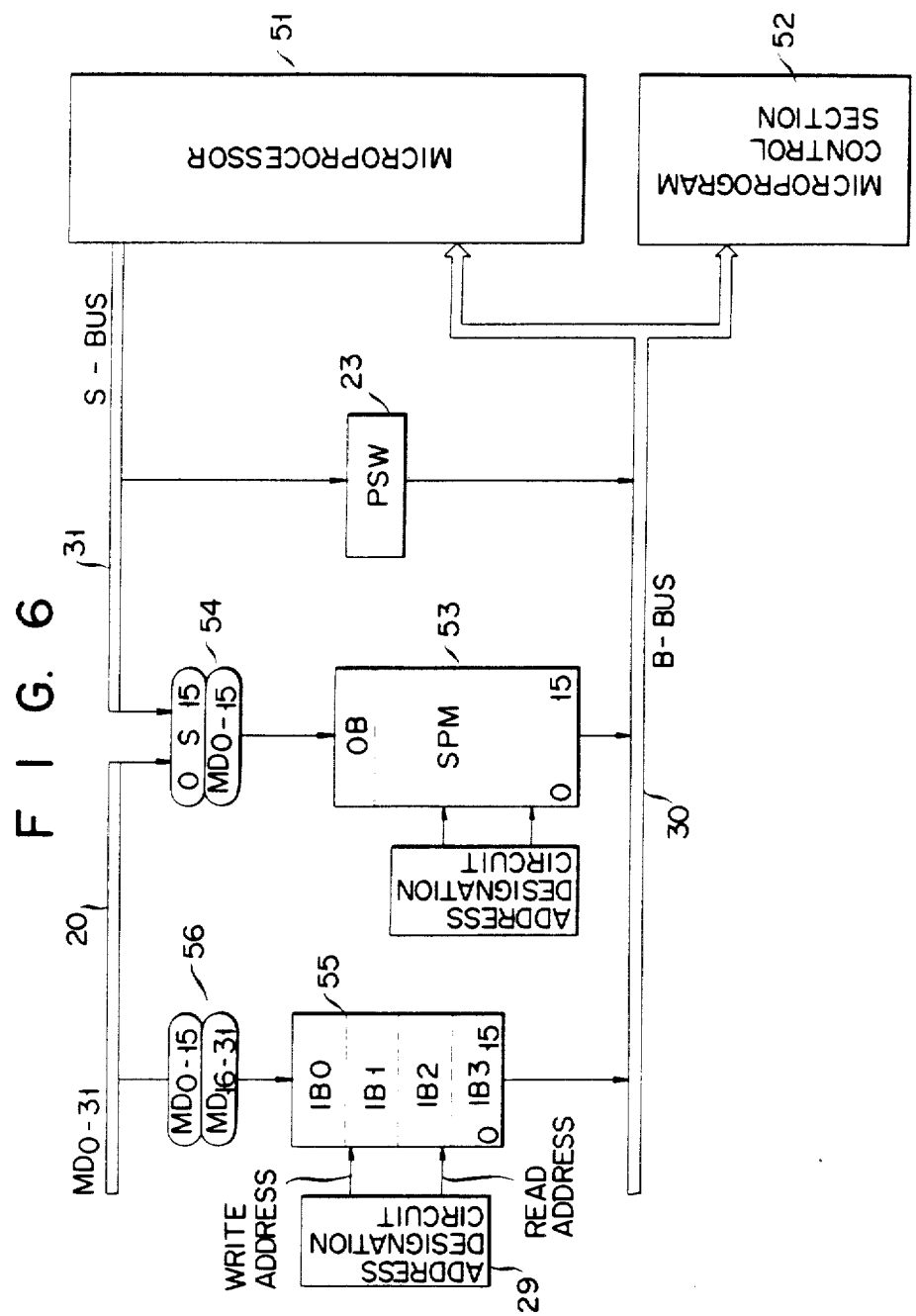

FIG. 8A INSTRUCTION EXECUTION

FIG. 8B MICROSTEP

FIG. 8C MEMORY DATA

FIG. 8D WRITE PULSE FOR IB OF SPM 22

FIG. 8E B-BUS 30

FIG. 8F ADDRESS OF CS 67

INFORMATION PROCESSOR

This is a continuation of application Ser. No. 73,386 filed Sept. 7, 1979 now abandoned.

BACKGROUND OF THE INVENTION

This invention relates to an information processor having low cost and capable of improving the operating speed of a central processing unit (CPU).

In recent years, the density of integrated circuits for fabricating a memory element has been increased greatly.

Taking a main memory element as an example, although the access time and the cycle time have not been changed substantially, the memory capacity per one chip has been increased to about 4 to 16 times of those of the prior art. Further, the memory capacity of a scratch pad memory device (SPM) having fast access time in which read/write and arithmetic operations can be performed in the fundamental cycle time of the CPU has been increased to 16 words.

Considering system cost, the percentage cost of the software of a computer system has also been increased in recent years. For this reason, it becomes important to use software prepared for use in conventional computers in a new type of computer without any modification.

Assume now that the number of bits that constitute a register of a prior art computer and of the word length of a data processed by an arithmetic logic unit (ALU) is 16 bits and that the processing unit of an instruction and an operand are also 16 bits, in a new type computer constructed to execute also a plurality of programs already prepared for use in the prior art computer, it can readily be understood by one skilled in the art that the number of bits comprising the registers in the new computer should also be 16.

On the contrary, for the purpose of improving the performance of a computer, it is essential to use high speed elements (for example, a Shotkey TTL, emitter coupled logic (ECL), etc.) and to increase, as far as possible, paralellism of the processing. For example, in order to obtain a main memory data transfer rate exceeding a specific rate, it is necessary to read/write the main memory device with 32 bit units instead of 16 bit units.

OBJECTS AND SUMMARY OF THE INVENTION

It is an object of this invention to provide an improved information processor capable of improving the processing speed of a CPU while maintaining program compatibility. In this computer, the fundamental data processing length is 16 bits (that is still maintaining 16-bit architecture), but the interface between the main memory device and the information processor can be operated with 32 bits for the instruction fetch.

This technique is based on the finding that the processing data width for instruction execution, such as operand fetch or operand storing, cannot be changed without affecting the compatibility, but the data width of instruction fetch can be changed without any compatibility problems.

Another object of this invention is to provide a novel information processor capable of increasing the speed of instruction processing and capable of simplifying hardware construction thereby decreasing cost by avoiding the need to have a 2 N-bit wide instruction buffer memory.

According to this invention, there is provided an information processor comprising a main memory unit constructed to simultaneously read or write 2 N bits (N is an integer), an N bit architecture central processing element including a scratch pad memory unit which has m locations each of which stores N bits; a memory bus constituted by 2 N bits and utilized to transfer a 2 N-bit instruction or an N-bit operand read out from the main memory to the central processing element; a selector which can select the memory bus shared, in units of N bits, and can output the 2 N-bit instruction to the scratch pad memory in the units of N bits; means for writing the 2 N-bit instruction read out from the main memory unit in accordance with the stream of instruction words into said scratch pad memory and the division of said data into two units of N bits each by the selector and for writing the N-bit operand transferred from the main memory unit into the scratch pad memory through the selector using N bits of the memory bus, thus executing desired data processing by the central processing element of said N bit architecture.

According to this invention, in a computer utilizing 16 bit architecture, for example, the advance fetch of an instruction word is done in units of 32 bits each so as to improve the processing speed; a train or stream of instructions each constituted by 32 bits fetched in one memory cycle is divided into two units of 16 bits each, and then written into an instruction buffer in a CPU; and the instruction words are read out from the instruction buffer in 16 bit units corresponding to the data length of a main data bus in the CPU. With this construction, it is possible to use memory elements fabricated with high density integrated circuits thus providing an information processor at low cost having excellent performance.

BRIEF DESCRIPTION OF THE DRAWINGS

This invention can be more fully understood from the following detailed description when taken in conjunction with the accompanying drawings, in which:

FIG. 1 is a block diagram showing the electrical connection between a CPU and a main memory device of one embodiment of this invention;

FIG. 2 is a block diagram showing the internal construction of the CPU shown in FIG. 1;

FIGS. 4A through 4D are charts showing the types of instruction words used in the invention;

FIG. 5A is a timing chart useful in describing the operation of the CPU where an instruction word is written into an instruction buffer 0 and an instruction buffer 1;

FIG. 5B is a timing chart useful in describing the operation of the CPU and the SPM where an instruction is written into an instruction buffer 2 and an instruction buffer 3;

FIG. 5C is a timing chart useful in describing the operation of a CPU and a SPM when an operand field is written into an operand buffer;

FIG. 6 is a block diagram showing another embodiment of this invention;

FIGS. 8A through 8F are timing charts useful in describing the operation of the information processor shown in FIG. 6.

DESCRIPTION OF THE PREFERRED EMBODIMENTS

Figure 3:
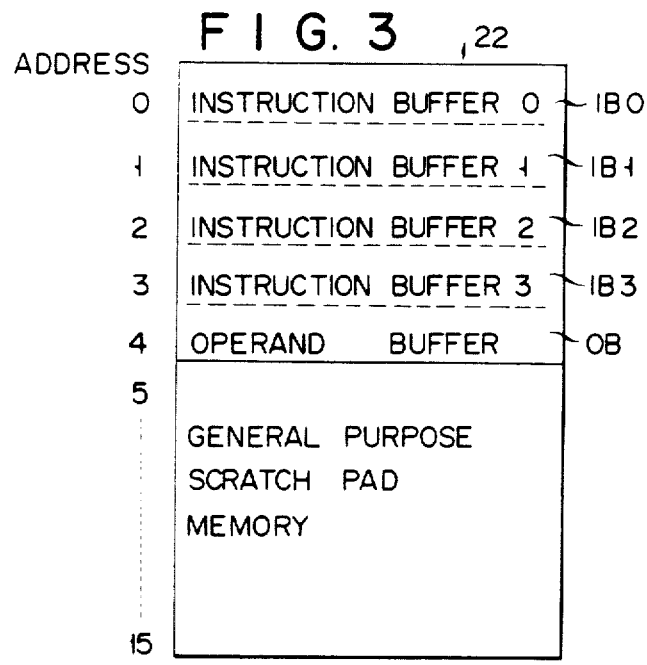
FIG. 3 is a chart showing the internal construction of an SPM of the CPU shown in FIG. 2.

FIG. 1 is a simplified block diagram showing the connection between a CPU and a main memory unit of a preferred embodiment of this invention.

Thus, address data and command data for example, a read command or a write command, are sent to a main memory unit 12 (MMU) from a CPU 11 over the address bus 13 and the command bus 14. Data is also transferred between the CPU 11 and the MMU 12 over the 32 bit bidirectional data bus 15. For brevity, the connections between the CPU 11 and the MMU 12 are hereinafter called a memory bus. However, it should be understood that a portion of the memory bus which is used to transfer data, that is the bus 15 shown in FIG. 1 is also called a memory bus. In this invention, as far as data is concerned, bus 15 is called the memory bus and may comprise a 32 bit bidirectional bus or two 32 bit unidirectional buses.

FIG. 2 is a block diagram showing the internal construction of the CPU 11 shown in FIG. 1. The block diagram, however, is simplified so that the invention may be easily understood. A selector 21 comprising a 16 bit multiplexer is connected to the input of a SPM 22 having a word length of 16 bits, so that 32 bit data ($MD_{0-31}$) on the memory bus 20 would be written into the SPM 22 in two units each consisting of 16 bits.

The output of the SPM 22 is connected to a B-bus 30. Although it is possible to connect various registers other than SPM 22, since such additional registers are not necessary for an understanding of the invention, the output of only a program status word register (PSW) 23 is shown connected to the B-bus line 30.

The CPU 11 contains 16 general registers $GR_0$ through $GR_{15}$, 24, and a working register AR 25 each including a 16 bit word length (in other words this system adopts a 16 bit architecture). The output of the B-bus 30 or one of the outputs GA of the general registers 24 are applied to one input of the arithmetic logic unit (ALU) 28 via a selector 26, whereas the other outputs GB of the general registers 24 or the output of the working register AR 25 are applied to the other input of ALU 28 via a selector 27. The output of ALU 28 is supplied to an S-bus 31 so as to be applied to the input of selector 21, PSW register 23, general registers 24 and working register AR 25.

A member constituted by the selector 21 and the SPM 22 acts as an interface for the MMU 12. The ALU 28 of 16 bit architecture and its peripheral apparatus are shown and described to an extent necessary to understand the invention. However, it should be understood that many design modifications are possible.

The circuit of FIG. 2 is constructed such that it is possible to write the data from the S-bus 31 in the SPM 22 via the selector 21, and a part of the selector 21 is constructed such that lower order 8 bits (0-7) and higher order 8 bits (8-15) of 16 bit data from the S-bus 31 may be interchanged and then written into the SPM 22. However, since such interchanging is not necessary for an understanding of this invention it will not be described further. The SPM 22 is provided with an address designating circuit 29 which designates the addresses to be read and written. However, the internal structure of the circuit 29 is not shown since it is not necessary for an understanding of this invention.

FIG. 3 is a chart showing the internal construction of the SPM 22. The invention is characterized in that a portion of SPM 22 is used as an instruction buffer (IB). More particularly, as shown in FIG. 3, the first address 0 through address 3 in the SPM 22, which is constructed to have 16 bits×16 addresses, are utilized as the IB0 through IB3.

Addresses 0 and 1 and addresses 2 and 3 constitute a buffer pair. Accordingly, a 32 bit instruction word read out from the MMU 12 as a unit is written into either one of the buffer pairs of SPM 22.

Thus, it is possible to read out instruction words in 16 bit units from one buffer pair while 32 bit instruction word is written into the other buffer pair in units of 16 bits.

The address 4 of the SPM 22 is used as an operand buffer (OB), while remaining addresses 5 through 15 can be used for the same purpose as that of a conventional scratch pad memory device, for example, working registers.

As has already been pointed out, the CPU of this invention utilizes a 16 bit architecture for compatibility with programs. For this reason, the bit length of an operand is 16 bits so that the operand buffer is required to allocate only one address of the SPM 22.

FIG. 4 shows the construction of instruction words used in the invention.

The type of the instruction words are classified into four groups, RR type and SF type which are two byte (16 bits) instruction words and RX type and RS type which are four byte (32 bits) instruction words. All of these instruction words are constructed by an operation code field, a first operand field and a second operand field. The functions of the first operand and the second operand differ depending on the instruction words. However, any general register number or mask value or numeric is assigned to the first operand field.

The general register number (index register number) and address specification (or numeric specification) are assigned to the second operand. In the operation code field, two digital hexadecimal codes which specify the instructions are assigned.

The respective type instructions will now be explained. RR type instruction: this instruction functions as an arithmetic operation or judgement between registers. $R_1$ shows the first operand in which the general register number or mask value are assigned. $R_2$ shows the second operand in which one of the general register numbers is assigned. SF type instruction word: this instruction functions as an arithmetic operation and selects the register and numeric. $R_1$ shows the first operand in which one of the general register numbers or a mask value is assigned. N shows the second operand which specifies the numeric. RX type instruction: this instruction functions as an arithmetic operation between a register and the contents of main memory. $R_1$ shows the first operand in which one of the general register numbers or a mask value is assigned. $X_2$ shows the general register number and its contents which are used for index address modification as an index value. A specifies the address of the main memory. The second operand of the RX type instruction is constructed by $X_2$ and A. RS type instruction: this instruction functions as an arithmetic operation between a register and the address (constant). $R_1$ shows the first operand in which one of the general registers is assigned. $X_2$ specifies the general register number and its contents are used for index address modification as an index value. K is used as a numeric. $X_2$ and K construct the second operand of the RS type instruction.

In the MMU 12, instruction words with 32 bits which are constructed by the above instruction types are stored.

On the other hand, CPU 11 reads instruction words sequentially in accordance with the stream of instruction words for executing data processing. However, in the case of a CPU having the advance fetch function such as this invention, the bit length of the instruction word read out from the MMU 12 need not be considered. Accordingly, CPU 11 can fetch in advance 32 bit instruction words through the memory bus 22 from the MMU 12.

The advance fetch operation will now be explained.

FIGS. 5A through 5C are timing charts representing the operation of MMU 12 and CPU 11 with regard to the advance control of the instruction words described above. In these Figures, the uppermost section represents a main memory cycle and the succeeding sections represent a step of the CPU, a memory bus, a selector, SPM write timing, and a SPM write address respectively.

In this embodiment, it is selected that one main memory cycle is 720 ns, and one step of the CPU takes 180 ns, so that one memory cycle of the MMU 12 corresponds to 4 steps of CPU 11. For simplifying the following description the 4 steps of the CPU 11 corresponding to one main memory are designated by consecutive reference numerals 0, 1, 2 and 3.

The operation of the information processor shown in FIG. 2 will now be described in detail with reference to FIGS. 5A through 5C.

More particularly, FIG. 5A shows a timing chart for explaining the operations of the CPU and the SPM at the time of writing instruction words into the IB0 and the IB1. In the preferential reading out of a command shown in FIG. 5A, the CPU 11 starts the main memory cycle at the 0 step of the main memory cycle. Suppose now that at this time the memory command is a read command and that the IB0 and IB1 are vacant, or idle, then the instruction word $MD_{0-31}$ read out of the MMU 12 would appear on the memory bus 20 at about the end of the second step and throughout the third step of the main memory cycle.

In a main memory access of the command word, advance fetch selector 21 selects $MD_{0-15}$ at the second step of the main memory cycle, whereas the address designating circuit 29 designates address 0 as the write address. The selected $MD_{0-15}$ is written into the address 0 of the SPM 22 by a timing signal $T_0$. More particularly, the most significant bytes (2 bytes) of 32 bit instruction words read out from the SPM 22 are written into IB0 of the SPM step of the main memory cycle, the selector 21 selects $MD_{16-31}$ and the address designating circuit 29 designates address 1 as the write address.

The selected $MD_{16-31}$ is written into the address 1 of SPM 22 by the write timing signal $T_1$. In other words, the least significant bytes (2 bytes) of the 32 bit instruction word read out from the MMU 12 are written into IB1 of the SPM 22 during the third step.

FIG. 5B shows the write timing for the instruction buffers (IB2, IB3) of the SPM 22 of the command word preferential read out type, which is substantially identical to FIG. 5A except that the write addresses (namely, address 2, address 3) of the IB2 and IB3 are designated by the address designating circuit 29.

More particularly, the most significant bytes (2 bytes) of a 32 bit instruction word read out from the MMU are written into the IB2 of the SPM 22 at the second step, while the least significant bytes (2 bytes) of the instruction words are written into the IB3 of the SPM 22 at the third step.

Since the circuit for advance control of instruction words is not necessary for an understanding of this invention, it will not be described herein.

FIG. 5C is a timing chart useful to explain the operation of the CPU and the SPM where an operand field is written into the operand buffer (OB).

In a case of reading an operand, it is read in a 16 bit mode designated at the start of a main memory cycle. An operand read out from the main memory unit 12 and having a bit length of 16 bits is caused to always appear at about the end of the second step and throughout the third step of the main memory cycle by the $MD_{0-15}$ on the memory bus 20 irrespective of the address in the MMU 12. In the 32 bit command preferential read out system, the reading of an operand is done in units of 16 bits and 32 bits as disclosed, for example, in copending U.S. patent application Ser. No. 32,880.

In the CPU, the selector 21 selects $MD_{0-15}$ at the second step of the main memory cycle and at the same time the address designating circuit 29 designates a write address which is address 4 of the operand buffer (OB). Thus, the operand is written into the operand buffer (OB) at the address 4 of the SPM 22 at a time T0.

Operand accessing is accomplished with 16 bit processing so that prior art 16 bit architecture computers can be used. This satisfies the need for program compatibility.

When reading an operand, since the third step of the main memory cycle of the CPU 11 is not used, where the main memory unit is constructed such that it can complete its main memory cycle in a time corresponding to 3 steps, the main memory cycle may be terminated at the end of the second step. How to execute the above described operations of the CPU 11 and the main memory unit 12 is determined depending upon the data processing procedure of the computer.

For example, for RR type instructions shown in FIG. 4, which do not need reading of an operand during the data processing procedure, a timing chart prepared by connecting together FIGS. 5A and 5B is used. On the other hand, in the case of an instruction requiring reading of an operand, a timing chart prepared by connecting together FIGS. 5A (or FIG. 5B) and 5C is used.

In the case of reading the SPM 22, it is possible to read out data which has been written into the IB0 (address 0) at the second step shown in FIG. 5A, and at the next (third) step. In this case, the writing operation of the data into the IB1 (address 1) at the third step and the reading operation from the IB0 (address 0) can be performed in parallel.

The data read out from the SPM 22 is produced on the B-bus 30 and is subjected to desired data processing in the ALU 28.

As can be understood from the foregoing description, when the invention is applied to a computer of the 16 bit architecture type, it is possible to readily effect advance fetch of instruction words in 32 bit units, for example.

The invention has the following advantages.

(1) By utilizing an increased capacity of the SPM fabricated with a high density of integrated circuits, an inexpensive instruction buffer can be realized.

(2) High performance can be obtained because 32 bit instruction words are read out from the main memory unit. Moreover, the information processor can be constructed at a low cost because the SPM can be fabricated with a number of 16 bit chips (for example, where RAM chips of 4 bits×16 addresses construction are used, the number of chips required for the SPM is only 4).

(3) The main register of the CPU, the ALU, and the main data bus line are all 16 bit type, so that the processor is inexpensive and is interchangeable with existing computers of the 16 bit architecture type.

Since advance fetch of instruction words can be done by reading out 32 bits at a time, it is possible to decrease the execution time per instruction.

For example, where instruction words of the RR type have a length of 16 bits, and where two steps of the CPU are required to execute the instruction, it is possible to read out two instruction words from the MMU 12 in one cycle, and it is possible to execute two instructions with the CPU at the same time, it is possible to execute one instruction word of the RR type in an extremely short time of the order of 360 ns.

Besides the advance fetch described above, an operand access is accomplished with 16 bit processing as in the 16 bit prior art architecture. Accordingly, there can be program compatibility between the information processor of this invention and the computer in the prior art. As a result, a program developed by the prior computer can be used for a computer to which the invention is applied.

FIG. 6 shows a modified embodiment of this invention in which elements corresponding to those shown in FIG. 2 are designated by the same reference numerals.

While in the embodiment shown in FIG. 2 the instruction buffer (IB0–IB4) is provided in SPM 22, in this modification, an instruction buffer (IB) 55 is formed independently of the SPM 22. For this reason, in this modification the SPM 53 is used as an operand store and an ordinary work area. This IB 55 is constituted by 16 bits×4 words, for example. Namely, IB 55 can be considered as the memory (IB0–IB4) of the SPM 22 shown in FIG. 3. A 32 bit instruction word sent from the MMU 12 via the M-bus 20 is sorted into the most significant bytes (M$_{0-15}$) and at least significant bytes (M$_{16-31}$) by the selector 56 and these bytes are stored in different addresses of IB 55. This write operation is the same as the one shown in FIGS. 5A and 5B.

The instruction words read out from the IB 55 are sent to a microprocessor 51 and to a microprogram control section 52 via a B-bus 30.

This microprocessor 51 is constituted by combining chips of the bit slice type microprocessor. For example, it comprises a 16 bit microprocessor comprising a combination of 4 chips of the AM 2901A type sold by Advanced Micro Devices, Inc. In response to an instruction output from the IB 55, a predetermined microinstruction is read out from the stored microprogram. The microprocessor 51 and register 23, SPM 52 etc. are controlled by the decode output of the microinstruction.

On the other hand, the operand is written in the operand location of the SPM 53 from the memory bus 20 through the selector 54. This write operation is the same as that shown in FIG. 5C.

With the construction described above, as the SPM 53 is utilized as a work area and an operand store, and since the 32 bit instruction is fetched in advance and is supplied to the microprocessor 51 or to the microprogram control section 52 without passing through the scratch pad memory, it is possible to reduce the processing time of the CPU in the same manner as in the embodiment shown in FIG. 2.

Figure 7:
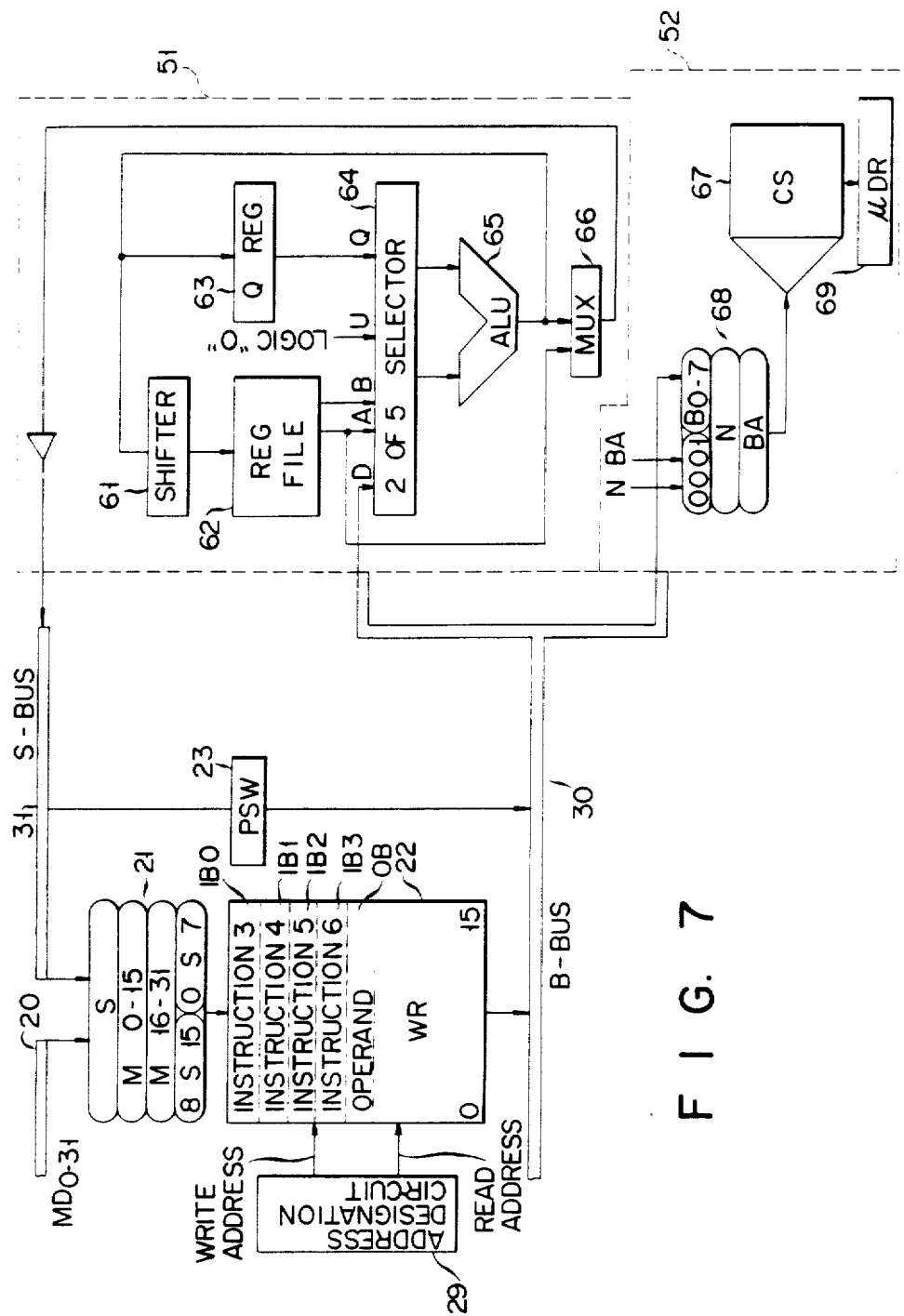
FIG. 7 is a block diagram showing details of the circuit construction of the embodiment shown in FIG. 6.

FIG. 7 is a block diagram showing details of the information processor for operating the embodiment shown in FIG. 6, in which elements corresponding to those shown in FIG. 2 are designated by the same reference characters.

The microprocessor 51 is identical to that described in connection with FIG. 6 and comprises a combination of 4 bit slice microprocessors such as the AM 2901A sold by Advanced Micro Devices Inc., U.S.A., for example.

The microprocessor 51 comprises a Q register 63, a 2 of 5 selector 64, a register file 62, an ALU 65, a multiplexer 66 and another working register (not shown) supplying data U to the selector. The Q register 63 is utilized as a working register; the selector 64 is connected to receive output data A,B from the register file 62, output data Q of the Q register 63, input data D from the data input bus line, and output data U from the other working register and supply outputs to the ALU 65; the ALU 65 receives the input data from the selector 64 and makes calculations, the multiplexer 66 multiplexes the output of the ALU 65 and the output data A from the register file 62 to apply the multiplexed data to an output data bus line Y; the shifter 61 which interconnects the register file 62 and the Q register 63 shifts or rotates the 32 bit data or interrupts the connection between two registers 62 and 63 for shifting and rotating 16 bit data. Since the construction of the microprocessor 51 is disclosed in a paper entitled "The AM 2900 Family Data Book" published by the Advanced Micro Devices, Inc. it is considered unnecessary to describe it here.

The purpose of the microprogram control section 52 is to control the microprocessor 51, SPM 22, PSW 23 or desired registers and it is constituted by a selector 68, a control storage device 67 for storing the microprogram constituted from the microinstructions, and a microinstruction register (μDR) 69 which is used to store microinstruction words.

The operation of the above described information processor of the preferential control type will be described hereunder with reference to FIGS. 8A through 8F.

FIGS. 8A through 8F are timing charts which show the relation between the execution of the microstep and the advance fetch of instruction words when two byte instructions (which are executed in two short cycle microsteps, for example, an RR type instruction of FIG. 4) are executed continuously.

Namely, FIG. 8A shows the state where the instruction 1, the instruction 2 and the instruction 3 . . . (executed in two microsteps) are executed continuously.

FIG. 8B shows the respective two microsteps in which the instruction 1, the instruction 2, the instruction 3 . . . are processed. For example, the instruction 1 terminates its processing by executing microstep 1-1 and microstep 1-2.

FIG. 8C is a timing chart showing fetching of instruction words to be executed next in 32 bit units from the main memory unit. The timing is the same as that for "memory data" shown in the respective memory bus 20 of FIG. 5A or FIG. 5B.

FIG. 8D shows the write pulses for writing instruction words fetched in the timing of FIG. 8C into the IB of SPM 22 and the timing is the same as the write timing of SPM 22 in FIG. 5A or FIG. 5B.

FIG. 8E shows the operation of the B-bus 30 in FIG. 7 and its timing.

FIG. 8F shows the CS address given in the CS 67 of FIG. 7 and its timing.

According to the information processor having the advance fetch function of the invention, the two byte instruction 1 and the two byte instruction 2 are written into, for example, the IB0 and IB1 of the SPM 22 respectively in the previous memory cycle.

Figure 9:
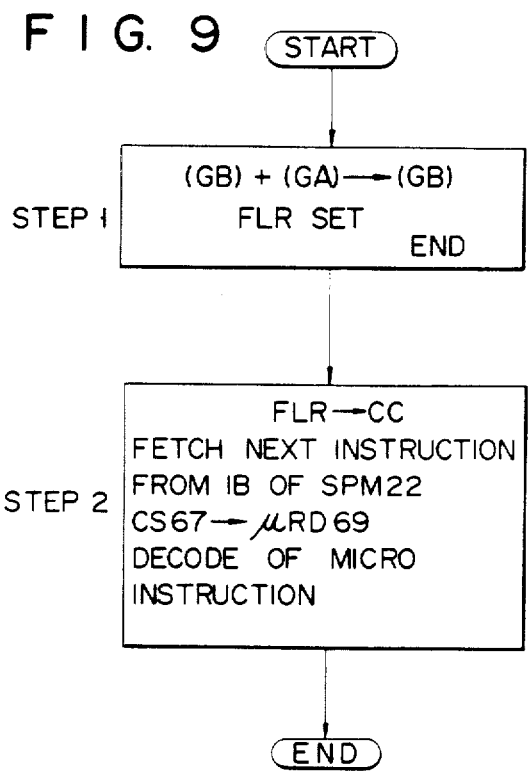
FIG. 9 is a flow chart of the microprogram for an ADD instruction of the RR type.

Accordingly, the microinstructions are executed promptly in the microstep 1-1 shown in FIG. 8B. At this time, the B-bus 30 is used for the execution of the instruction 1 such as shown in FIG. 8E. The CS address 1-2 is given to the CS 67 for reading out the microinstruction of the microstep 1-2 to be executed next as shown in FIG. 8F. As a result, the microinstruction of the microstep 1-2 is executed next as shown in FIG. 8B, thus the processing of the instruction 1 is terminated. The microinstruction of the microstep 1-2 is for the preparation of the next instruction 2 and from for example, IB1 of the SPM 22, the next instruction 2 is read out. Accordingly, the B-bus 30 is used for reading the instruction 2. The CS address 2-1 which is constructed by the OP code of the instruction 2 read out is given to the CS 67 and the microinstruction is read out from the CS 67. FIG. 9 shows the contents of one embodiment of the microsteps 1-1 and 1-2.

The embodiment of FIG. 9 shows the microsteps wherein the RR type ADD instruction and the address of the register file 62 which specifies the first operand are set in the R1 field and the address of the register file 62 which specifies the second operand is set in the R2 field. The operation of FIG. 9 will be explained referring FIG. 7. In step 1, the contents of the register file 62 (GB) specified in the R1 field and the contents of the register file 62 (GA) specified in the R2 field are inputted to the ALU 65 through the selector 64 where the operation of (GA)+(GB) is executed.

The arithmetic result of the ALU 65 is stored in the register file 62 specified in the R1 field through the shifter 61. The state information of the arithmetic result is set to the flag register (not shown) through MUX 66, S-bus 31 and step 1 is terminated. In the next step 2, the contents of the flag register are set in the condition code field CC of PSW 22. For execution preparation of the next instruction 2, the next instruction 2 is read out from, for example, IB1 of the SPM 22.

The contents in the operand field and the read out instruction 2 are given to the microprocessor 51 and the OP code is given to the microprogram control section 52.

The microinstruction is read into μDR 69 from CS 67 by the CS address constructed by the OP code and decoded by the decoder (not shown) and step 2 is terminated.

Processing of the next instruction 2, referring to FIG. 8 again, is as follows. In the first microstep 2-1 of the instruction 2, the microinstruction read out from the CS 67 is executed promptly. At this time, the B-bus 30 is used for the execution of the instruction 2. The CS address 2-2 is given to the CS 67 for reading out the microinstruction of the microstep 2-2. Accordingly, after the microinstruction of the microstep 2-1 is executed, the microinstruction of the step 2-2 is executed promptly.

During the execution of an instruction 2 shown in FIG. 8A, instruction words 3 and 4 (both 2 byte instructions) to be executed next are transferred from the MMU 12 as one word (32 bits) through the memory bus 20.

The selector 21 isolates the words into 16 bit units (two bytes per word) and selects these two instruction words 3 and 4 (both 32 bit length) and transfers them to an instruction buffer section (for example, IB2 and IB3) of the SPM 22 in which the instruction words 3 and 4 are written at the trailing edge of an IB write pulse. The write operation is accomplished in parallel with the execution of the microstep 2-1 of the instruction 2. The instruction word 3 written into the instruction buffer section is read out at a suitable time when the microstep 2-2 is being executed and is transferred to the microprogram control section 52 via the B-bus 30. Accordingly, the B-bus 30 is used for fetching the instruction word 3 from the IB.

In the microprogram control section 52, the selector 68 selects a CS address (3-1) prepared by combining a binary constant "0001" and the operation codes $B_{0-7}$ of the instruction word 3 represented by bit 0 through bit 7 of the B-bus 30 and applies the selected address information to the CS 67 to read out the microinstruction (3-1) and store it in the μDR 69. At the time of completing the microstep (2-2) of instruction 2, the leading microinstruction (3-1) of a microroutine corresponding to the instruction word 3 to be executed next has already been stored in the μDR 69. The next instruction word 4 is written into, for example, the IB3 in parallel with the operation.

Instruction 3 and instruction 4 are executed in the same steps as described above.

For this reason, according to this invention it is possible to change to the execution of the instruction word 3 without providing a microstep for an inoperative state. Also the instruction 4 is transferred from an instruction buffer section of SPM 22 to a microprogram control section 52 via B-bus 30 at a suitable time during execution of instruction 3. In this same manner, in the microprogram control section 52 too, microroutines corresponding to OP codes are sequentially read out.

What is claimed is:

1. In an information processor including a main memory having a plurality of memory locations for storing and reading operand information and program instruction information, an N bit architecture central processing unit, and a memory bus for transferring operand information and program instruction information from the main memory to the central processing unit; the improvement comprising said memory bus having a width of 2N bits, and said central processing unit comprising:

a scratch pad memory including at least one operand buffer having an N bit width and at least two instruction buffers each having an N bit width;

a microprogram control section including at least one microprogram which is selectable based on information stored in said scratch pad memory;

an N bit data bus connected to said scratch pad memory and said microprogram control section;

first means for causing N bit operand information to be read from said main memory onto the memory bus and 2N bits of information including instructions to be read at one time from said main memory onto the memory bus, and for causing said N bit operand information read from the main memory to be written into said operand buffer and said 2N bits of information including instructions read from the main memory to be written into said instruction buffers;

a selector connected between said memory bus and said scratch pad memory; and second means for causing said selector to select N bits of said memory bus when said first means causes N bit operand information to be read onto the memory bus from said main memory to enable said N bit operand information read from said main memory to be written into said operand buffer, and for causing said selector to select 2N bits of said memory bus when said first means causes 2N bits of information including instructions to be read at one time onto the memory bus from said main memory, N bits of said memory bus being selected to enable N bits of said 2N bits of information on said memory bus read from said main memory to be written into one of said instruction buffers and a further N bits of said memory bus being selected to enable a further N bits of said 2N bits of information on said memory bus read from said main memory to be written into the other of said instruction buffers.

2. In an information processor according to claim 1, wherein the improvement further comprises said microprogram control section including means for storing said at least one microprogram comprised of microinstructions, means for reading microinstructions from said means for storing and means for holding a microinstruction read from said means for storing, and means for reading N bit information from said instruction buffers in said scratch pad memory to said N bit data bus, said microprogram control section means for reading selecting a start address of a microprogram contained in said means for storing in accordance with an operation code included in the N bit information contained in one of said instruction buffers and reading the first microinstruction of said selected microprogram to said means for holding.

3. In an information processor according to claim 2, wherein the improvement further comprises said first means including means for causing N bit information to be read from said main memory into said one of said instruction buffers while said microinstruction held in said means for holding is being executed.

4. In an information processor according to claim 2, wherein the improvement further comprises said microprogram control section means for reading including means for reading a subsequent microinstruction of the selected microprogram while said first microinstruction is being executed.

5. In an information processor according to claim 4, wherein the improvement further comprises said instruction buffer reading means including means for reading N bit information from the other of said instruction buffers to said N bit data bus while said subsequent microinstruction is being executed.

6. In an information processor including a main memory having a plurality of memory locations for storing and reading operand information and program instruction information, an N bit architecture central processing unit, and a memory bus for transferring operand information and instruction information from the main memory to the central processing unit; the improvement comprising said memory bus having a width of 2N bits, and said central processing unit comprising:

an instruction buffer having at least two N bit widths;

a microprogram control section including at least one microprogram which is selectable based on information stored in said instruction buffer;

an N bit data bus connected to said instruction buffer and said microprogram control section;

a scratch pad memory including at least one operand buffer having an N bit width;

first means for causing N bit operand information to be read from said main memory onto the memory bus and 2N bits of information including instructions to be read at one time from said main memory onto the memory bus, and for causing said N bit operand information read from the main memory to be written into said operand buffer and said 2N bits of information including instructions read from the main memory to be written into said instruction buffer;

a first selector connected between said memory bus and said instruction buffer;

a second selector connected between said memory bus and said scratch pad memory; and second means for causing said second selector to select N bits of said memory bus when said first means causes N bit operand information to be read from said main memory to enable said N bit operand information read from said main memory to be written into said operand buffer, and for causing said first selector to select 2N bits of said memory bus when said first means causes 2N bits of information including instructions to be read at one time onto the memory bus from said main memory, N bits of said memory bus being selected to enable N bits of said 2N bits of information on said memory bus read from said main memory to be written into one of the N bit widths of said instruction buffer and a further N bits of said memory bus being selected to enable a further N bits of said 2N bits of information on said memory bus read from said main memory to be written into the other of the N bit widths of said instruction buffer.

7. In an information processor according to claim 6, wherein the improvement further comprises said microprogram control section including means for storing said at least one microprogram comprised of microinstructions, means for reading microinstructions from said means for storing and means for holding a microinstruction read from said means for storing, and means for reading N bit information from said instruction buffer to said N bit data bus, said microprogram control section means for reading selecting a start address of a microprogram contained in said means for storing in accordance with an operation code included in the N bit information contained in one of said N bit widths of said instruction buffer and reading the first microinstruction of said selected microprogram to said means for holding.

8. In an information processor according to claim 7, wherein the improvement further comprises said first means including means for causing N bit information to be read from said main memory into said one N bit width of said instruction buffer while said microinstruction held in said means for holding is being executed.

9. In an information processor according to claim 7, wherein the improvement further comprises said microprogram control section means for reading including means for reading a subsequent microinstruction of the selected microprogram while said first microinstruction is being executed.

10. In an information processor according to claim 9, wherein the improvement further comprises said instruction buffer reading means including means for reading N bit information from the other of said N bit width of said instruction buffer to said N bit data bus while said subsequent microinstruction is being executed.

* * * * *